(12) United States Patent
Lim et al.

(10) Patent No.: US 9,056,522 B2
(45) Date of Patent: Jun. 16, 2015

(54) TAPERED ROLLER WHEEL BEARING ASSEMBLY

(71) Applicant: IL JIN GLOBAL CO., LTD., Seoul (KR)

(72) Inventors: Jong Keun Lim, Busan (KR); Seungjoon Lee, Seoul (KR)

(73) Assignee: IL JIN GLOBAL CO., LTD., Seoul (KR)

( * ) Notice: Subject to any disclaimer, the term of this patent is extended or adjusted under 35 U.S.C. 154(b) by 0 days.

(21) Appl. No.: 14/144,746

(22) Filed: Dec. 31, 2013

(65) Prior Publication Data

US 2014/0294332 A1 Oct. 2, 2014

(30) Foreign Application Priority Data

Mar. 26, 2013 (KR) ........................ 10-2013-0032179

(51) Int. Cl.
| | |
|---|---|
| B60B 27/02 | (2006.01) |
| F16C 19/18 | (2006.01) |
| B60B 27/00 | (2006.01) |
| F16C 19/38 | (2006.01) |
| F16C 33/58 | (2006.01) |

(52) U.S. Cl.
CPC ........... *B60B 27/001* (2013.01); *F16C 2220/70* (2013.01); *F16C 19/386* (2013.01); *F16C 33/585* (2013.01); *F16C 2240/40* (2013.01); *F16C 2326/02* (2013.01)

(58) Field of Classification Search
CPC . B60B 27/001; F16C 2220/70; F16C 19/383; F16C 19/385; F16C 19/386; F16C 33/585; F16C 2240/40; F16C 2326/02

USPC .................................................. 384/544, 589
See application file for complete search history.

(56) References Cited

U.S. PATENT DOCUMENTS

| | | | | |
|---|---|---|---|---|
| 5,816,711 | A * | 10/1998 | Gingrich ....................... | 384/488 |
| 6,551,190 | B2 * | 4/2003 | Hofmann et al. ............. | 464/178 |
| 7,695,195 | B2 * | 4/2010 | Okasaka ....................... | 384/544 |
| 8,745,874 | B2 * | 6/2014 | Kubota et al. ............ | 29/898.042 |
| 2004/0096133 | A1* | 5/2004 | Toda et al. .................... | 384/589 |
| 2004/0252927 | A1* | 12/2004 | Hirai et al. ................... | 384/544 |
| 2006/0269181 | A1* | 11/2006 | Hattori et al. ................ | 384/544 |
| 2007/0177839 | A1* | 8/2007 | Van De Sanden et al. .... | 384/589 |
| 2009/0116779 | A1* | 5/2009 | Komori et al. ............... | 384/544 |

(Continued)

FOREIGN PATENT DOCUMENTS

| | | |
|---|---|---|
| JP | 11-072106 | 3/1999 |
| JP | 2010-133559 | 6/2010 |

(Continued)

*Primary Examiner* — Alan B Waits
(74) *Attorney, Agent, or Firm* — Lexyoume IP Meister, PLLC (57) ABSTRACT

A tapered roller wheel bearing assembly may include: a hub provided with a hub flange for mounting a wheel formed radial outwardly at an end portion thereof and a hub raceway formed at a side portion close to the hub flange; an outer ring enclosing the hub and provided with an outer raceway corresponding to the hub raceway on an interior circumference thereof; and a tapered roller disposed between the hub raceway and the outer raceway and allowing a relative rotation of the hub and the outer ring, wherein a flange base is formed between the hub flange and the hub raceway and a first undercut for grinding the hub raceway is formed at the flange base, and wherein a second undercut for dispersing stress concentrated on the first undercut is further formed at the flange base.

9 Claims, 8 Drawing Sheets

(56) References Cited

U.S. PATENT DOCUMENTS

2010/0316323 A1* 12/2010 Shibata et al. ............... 384/589
2012/0243818 A1* 9/2012 Takimoto et al. ............ 384/589

FOREIGN PATENT DOCUMENTS

| JP | 2011-163454 | 8/2011 |
| JP | 2012-202436 | 10/2012 |

* cited by examiner

TAPERED ROLLER WHEEL BEARING ASSEMBLY

CROSS-REFERENCE TO RELATED APPLICATION

This application claims priority to and the benefit of Korean Patent Application No. 10-2013-0032179 filed in the Korean Intellectual Property Office on Mar. 26, 2013, the entire contents of which are incorporated herein by reference.

BACKGROUND OF THE INVENTION (a) Field of the Invention

The present invention relates to a tapered roller wheel bearing assembly. More particularly, the present invention relates to a tapered roller wheel bearing assembly having a second undercut for dispersing stress concentrated on a first undercut formed at a flange base portion.

(b) Description of the Related Art

Generally, a bearing is disposed between a rotating element and a non-rotating element so as to smooth rotation of the rotating element. Various types of bearings such as a ball bearing, a tapered roller bearing, needle bearing, and so on are currently used.

A wheel bearing is one type of such bearings, and rotatably connects a wheel that is the rotating element to a vehicle body that is non-rotating element. The wheel bearing includes an inner ring (and/or a hub) connected to one of a wheel or a vehicle body, an outer ring connected to the other of the wheel or the vehicle body, and rolling elements disposed between the outer ring and the inner ring.

Balls or tapered rollers are used as the rolling elements of the wheel bearing. Wheel bearings using balls are applied to small vehicles, and wheel bearings using tapered rollers are applied to large vehicles such as buses, trucks and so on.

Figure 1:
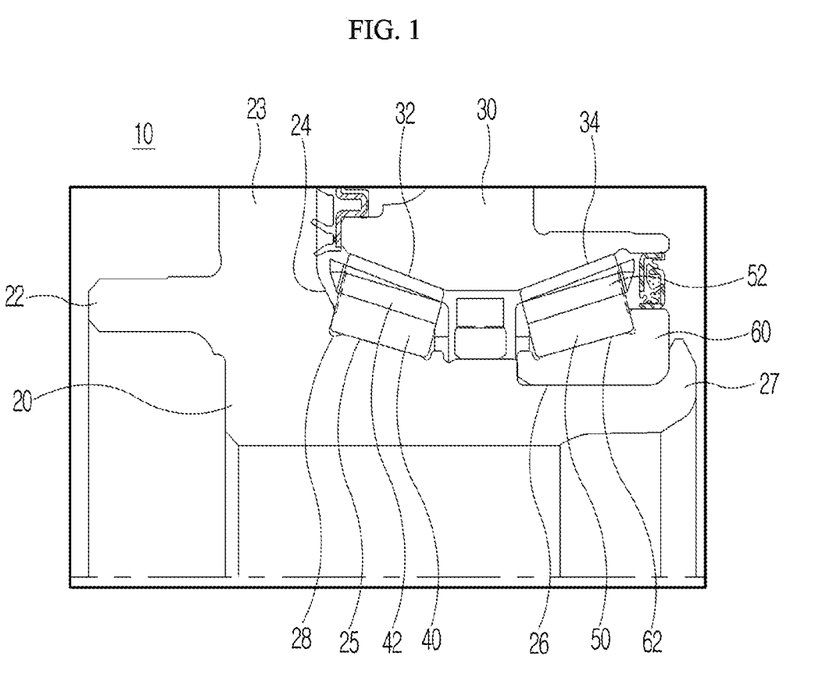
FIG. 1 is a cross-sectional view of a conventional tapered roller wheel bearing assembly.
Figure 2:
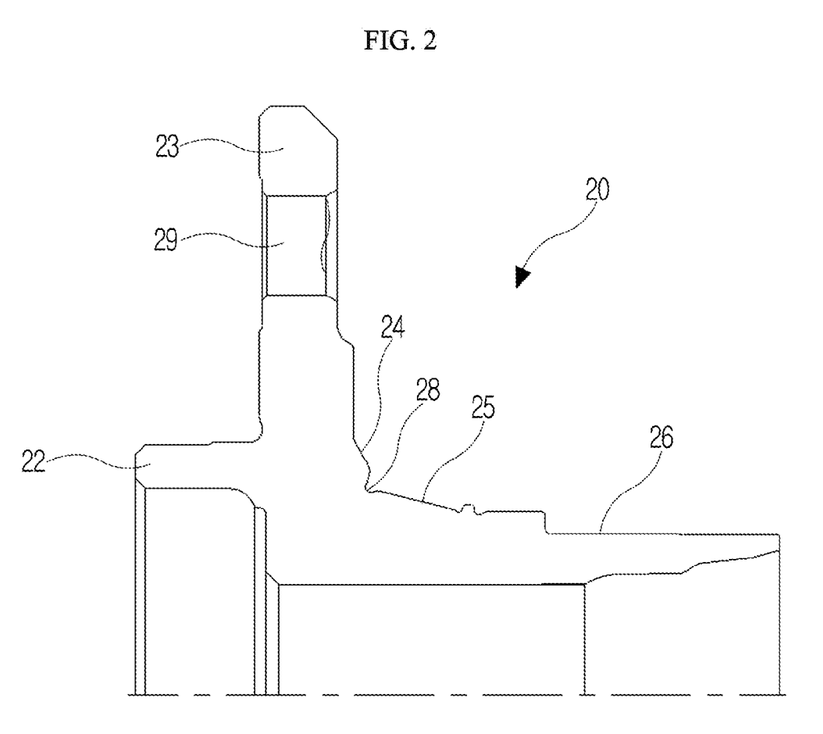
FIG. 2 is a cross-sectional view of a hub used in a conventional tapered roller wheel bearing assembly.
Figure 3:
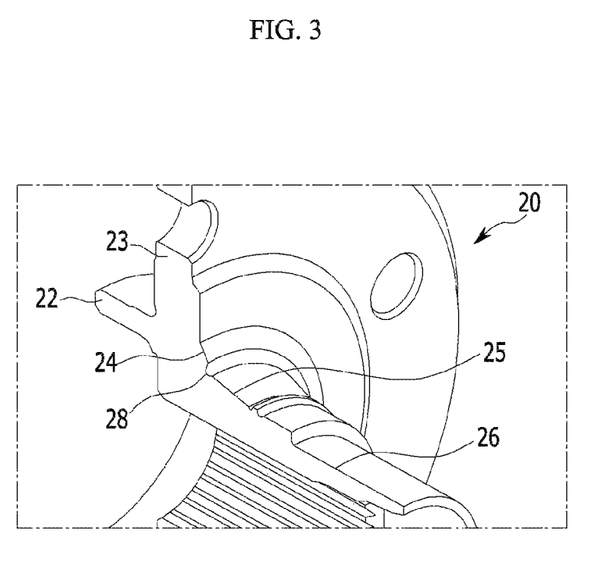
FIG. 3 is a partial perspective view of a hub used in a conventional tapered roller wheel bearing assembly.

A conventional tapered roller wheel bearing assembly is illustrated in FIG. 1 to FIG. 3.

As shown in FIG. 1 to FIG. 3, the conventional tapered roller wheel bearing assembly 10 includes a hub 20, an inner ring 60, an outer ring 30, and first and second tapered rollers 40 and 50.

A hub flange 23 for mounting a wheel is formed at a side portion of the hub 20 and a stepped portion 26 is formed on the other side portion of the hub 20. In addition, a hub raceway 25 is formed on an exterior circumference of the hub 20 between the hub flange 23 and the stepped portion 26, and a flange base 24 is formed at a connecting portion of the hub raceway 25 and the hub flange 23. Typically, a cross-section of the flange base 24 is formed in a curved fashion. A bolt hole 29 is formed at a radial outer portion of the hub flange 23 and a bolt is inserted in the bolt hole 29 such that the wheel is mounted on the hub flange 23. In addition, a pilot 22 for supporting the wheel is protruded from a side surface of the hub 20 in an axial direction.

The inner ring 60 is press-fitted onto the stepped portion 26 and an inner raceway 62 is formed on an exterior circumference of the inner ring 60. After the inner ring 60 is press-fitted onto the stepped portion 26, an end portion 27 of the hub 20 is bent radially outwardly so as to catch the inner ring 60. Thereby, preload is applied to the first and second tapered rollers 40 and 50.

The outer ring 30 is spaced radially outwardly from the hub 20 and the inner ring 60 and encloses the hub 20 and the inner ring 60. First and second outer raceways 32 and 34 corresponding to the hub raceway 25 and the inner raceway 62 are formed on an interior circumference of the outer ring 30.

A plurality of first tapered rollers 40 is mounted between the hub raceway 25 and the first outer raceway 32 in a state of being mounted in a first retainer 42, and a plurality of second tapered rollers 50 is mounted between the inner raceway 62 and the second outer raceway 34 in a state of being mounted in a second retainer 52.

Meanwhile, in a case that the first and second tapered rollers 40 and 50 are mounted on the hub 20 and the inner ring 60, the hub raceway 25 and protruded portions positioned at both end portions of the hub raceway 25, the inner raceway 62, and protruded portions positioned at both end portions of the inner raceway 25 that may contact with the first and second tapered rollers 40 and 50 should be machined precisely. Generally, although edges of the tapered rollers are arched, raceways are not machined in an arched fashion but are machined in a straight fashion due to characteristics of machining. In addition, since machined surfaces of each raceway and machined surfaces of protruded portions positioned at the both end portions of each raceway form angles, an edge portion at which the machined surfaces are joined is difficult to be machined. To solve such problems, an undercut is formed at the edge portion at which the machined surfaces are joined. That is, a groove is formed in advance circumferentially at the edge portion at which the machined surfaces are joined for ease of machining.

Figure 4:
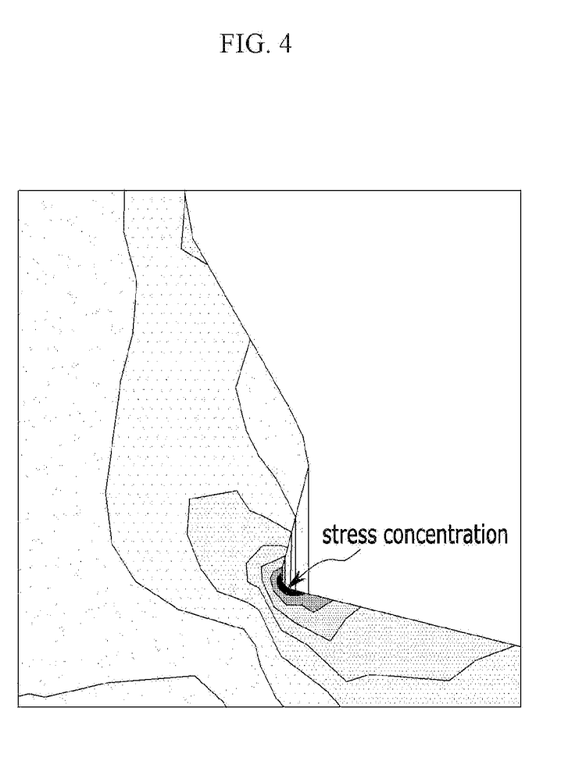
FIG. 4 illustrates stress distribution when impact is applied to a hub used in a conventional tapered roller wheel bearing assembly.

However, if the undercut is formed for ease of machining, the wheel bearing assembly becomes weak against impact. Particularly, if instant impact or strong impact is applied through the hub flange 23, as shown in FIG. 4, stress is concentrated on the undercut 28 formed at the flange base 24 and crack may occur around the undercut 28 or the hub 20 may be damaged due to concentration of stress. Since the undercut 28 should be formed for ease of machining, means for dispersing stress that may be concentrated on the undercut 28 is necessary.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a tapered roller wheel bearing assembly having advantages of dispersing stress by forming an additional undercut near an undercut for machining a hub raceway.

A tapered roller wheel bearing assembly according to an exemplary embodiment of the present invention may include: a hub provided with a hub flange for mounting a wheel formed radial outwardly at an end portion thereof, a stepped portion formed at an exterior circumference of the other end portion thereof, and a hub raceway formed at an exterior circumference between the hub flange and the stepped portion; an inner ring press-fitted on the stepped portion of the hub and provided with an inner raceway formed at an exterior circumference thereof; an outer ring enclosing the hub and the inner ring and provided with first and second outer raceways corresponding to the hub raceway and the inner raceway and formed at an interior circumference thereof; a first tapered roller disposed between the hub raceway and the first outer raceway and allowing a relative rotation of the hub or the inner ring and the outer ring; and a second tapered roller disposed between the inner raceway and the second outer raceway and allowing the relative rotation of the hub or the inner ring and the outer ring, wherein a flange base is formed between the hub flange and the hub raceway and a first undercut for grinding the hub raceway is formed at the flange base, and wherein a second undercut for dispersing stress concentrated on the first undercut is further formed at the flange base.

The second undercut may be formed at a radial outside of the first undercut and spaced apart from the first undercut by a predetermined distance.

Size of the second undercut may be larger than that of the first undercut.

A pilot for supporting the wheel may be protruded in an axial direction at a side surface of the hub and the second undercut may be formed at the same radial position as the pilot substantially.

A first sealing member for preventing inflow of foreign material may be mounted between the hub flange and an end of the outer ring, and a second sealing member for preventing inflow of foreign material may be mounted between an interior circumference of the other end portion of the outer ring and an exterior circumference of the inner ring.

The second undercut may be positioned at a radial inside from the first sealing member.

A tapered roller wheel bearing assembly according to another exemplary embodiment of the present invention may include: a hub provided with a hub flange for mounting a wheel formed radial outwardly at an end portion thereof and a hub raceway formed at a side portion close to the hub flange; an outer ring enclosing the hub and provided with an outer raceway corresponding to the hub raceway on an interior circumference thereof; and a tapered roller disposed between the hub raceway and the outer raceway and allowing a relative rotation of the hub and the outer ring, wherein a flange base is formed between the hub flange and the hub raceway and a first undercut for grinding the hub raceway is formed at the flange base, and wherein a second undercut for dispersing stress concentrated on the first undercut is further formed at the flange base.

The second undercut may be formed at a radial outside of the first undercut and spaced apart from the first undercut by a predetermined distance.

Size of the second undercut may be larger than that of the first undercut.

A pilot for supporting the wheel may be protruded in an axial direction at a side surface of the hub and the second undercut may be formed at the same radial position as the pilot substantially.

DETAILED DESCRIPTION OF THE EMBODIMENTS

An exemplary embodiment of the present invention will hereinafter be described in detail with reference to the accompanying drawings.

Figure 5:
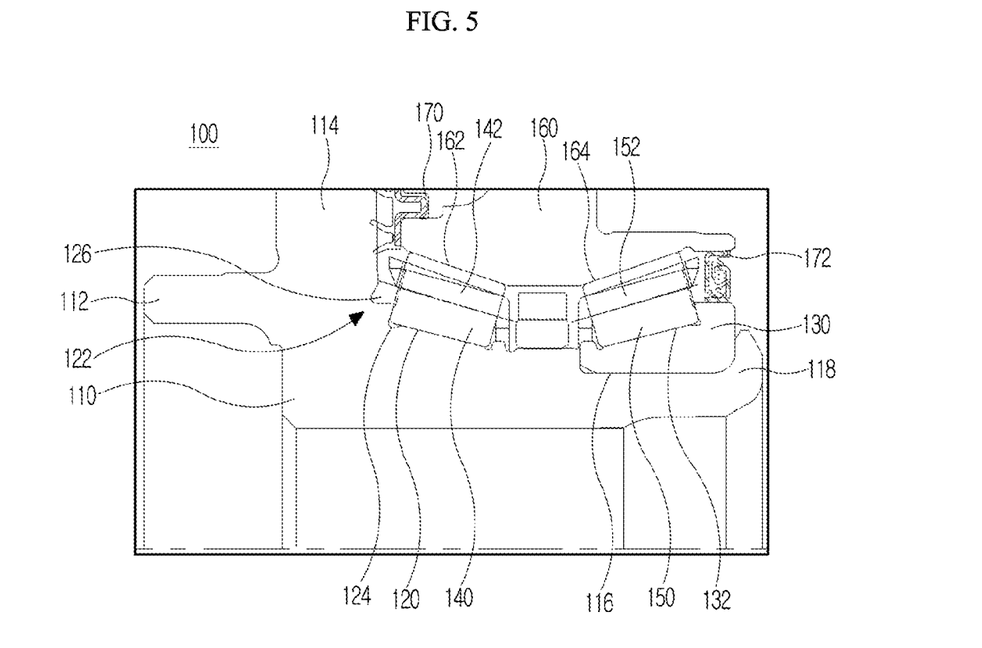
FIG. 5 is a cross-sectional view of a tapered roller wheel bearing assembly according to an exemplary embodiment of the present invention.
Figure 6:
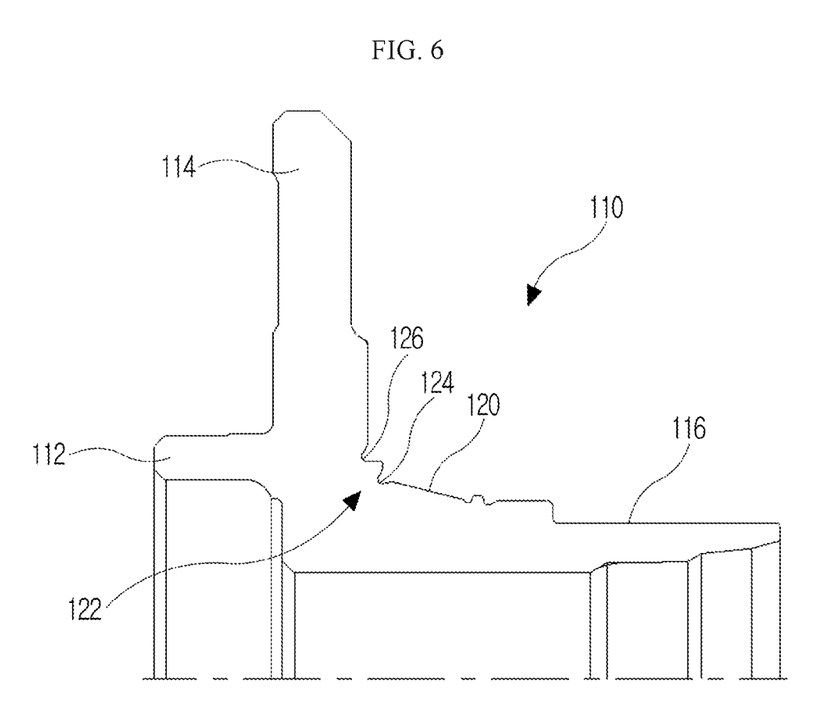
FIG. 6 is a cross-sectional view of a hub used in a tapered roller wheel bearing assembly according to an exemplary embodiment of the present invention.
Figure 7:
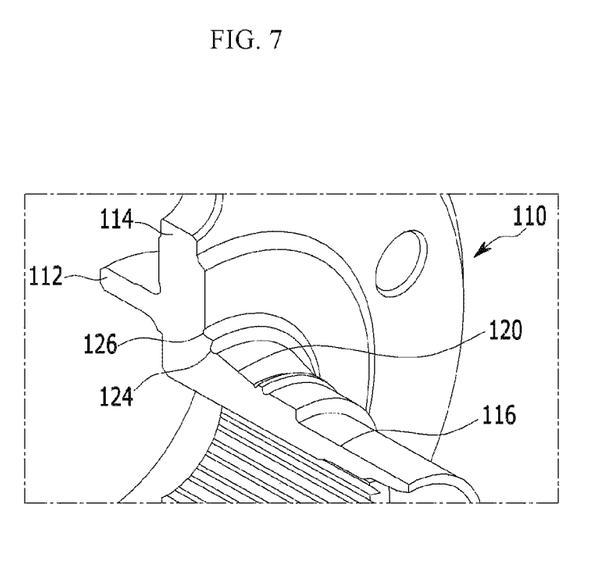
FIG. 7 is a partial perspective view of a hub used in a tapered roller wheel bearing assembly according to an exemplary embodiment of the present invention.

FIG. 5 is a cross-sectional view of a tapered roller wheel bearing assembly according to an exemplary embodiment of the present invention, FIG. 6 is a cross-sectional view of a hub used in a tapered roller wheel bearing assembly according to an exemplary embodiment of the present invention, and FIG. 7 is a partial perspective view of a hub used in a tapered roller wheel bearing assembly according to an exemplary embodiment of the present invention.

A tapered roller wheel bearing assembly 100 illustrated in FIG. 5 to FIG. 7, for better comprehension and ease of description, exemplifies any one tapered roller wheel bearing assembly among various tapered roller wheel bearing assemblies. Therefore, it is to be understood that spirit of the present invention is not limited to the tapered roller wheel bearing assembly 100 exemplified in this specification but is applied to various tapered roller wheel bearing assemblies. It is further to be understood that the spirit of the present invention can be applied to any bearing including a rotating ring (a ring that can be rotatable), a non-rotating ring (a ring that cannot be rotatable), and a plurality of tapered rollers interposed between the rotating ring and the non-rotating ring. In addition, the tapered roller wheel bearing assembly illustrated in FIG. 5 to FIG. 7 is a tapered roller wheel bearing assembly for a driving wheel. Since a tapered roller wheel bearing assembly for a driven wheel is similar to the tapered roller wheel bearing assembly for the driving wheel, however, it is to be understood that the spirit of the present invention is not limited to the tapered roller wheel bearing assembly for the driving wheel but is applied to the tapered roller wheel bearing assembly for the driven wheel.

In addition, for ease of description, FIG. 5 to FIG. 7 exemplify that the spirit of the present invention is applied to a '$3^{rd}$-generation tapered roller wheel bearing', but is not limited thereto. That is, the spirit of the present invention can be applied to tapered roller wheel bearings of all the generations.

Meanwhile, for ease of description, a region close to a wheel (not shown) is called an outboard and a region far from the wheel is called an inboard in all the constituent elements included in the tapered roller wheel bearing assembly.

As shown in FIG. 5 to FIG. 7, the tapered roller wheel bearing assembly 100 according to an exemplary embodiment of the present invention includes a hub 110, an inner ring 130, an outer ring 160, and first and second tapered rollers 140 and 150. It is shown in this specification, but is not limited to, that two rows 2 tapered rollers are used. The number of rows of the tapered rollers may be suitably chosen by a person of an ordinary skill in the art. Typically, the first and second tapered rollers 140 and 150 may be formed by fitting a plurality of tapered rollers into first and second retainers 142 and 152 made of resin material.

The hub 110 has a cylindrical shape and the wheel of a vehicle is coupled to an outboard end portion of the hub 110. For this purpose, a hub flange 114 extending radially outwardly and a pilot 112 protruding to an outboard side along a rotation axis are formed at the outboard end portion of the hub 110. A bolt hole is bored at the hub flange 114 such that the wheel of the vehicle is coupled to the hub 110 through coupling means such as a bolt, and the pilot 112 guides and supports the wheel when the wheel is coupled to the hub 110. In addition, a stepped portion 116 is formed on an inboard end portion of the hub 110, and an end portion 118 is extended from the stepped portion 116. The end portion 118 is extended straightly to the rotation axis direction before orbital forming, but is deformed plastically in a radial outward direction after the orbital forming. A hub raceway 120 is formed on an exterior circumference between the stepped portion 116 of the hub 110 and the hub flange 114, and a flange base 122 is formed between the hub flange 114 and the hub raceway 120.

The inner ring 130 is press-fitted on the stepped portion 116 of the hub 110, and an inner raceway 132 is formed on an exterior circumference of the inner ring 130. The inner ring 130 is mounted on the hub 110 through orbital forming of the end portion 118 of the hub 110. In this process, preload may be applied to the first and second tapered rollers 140 and 150. It is exemplified in this specification that the inner ring 130 is mounted on the hub 110 through the orbital forming, but the inner ring 130 may be mounted on the hub 110 by a bolt.

The outer ring 160 is positioned radially outwardly from the hub 110 and encloses the hub 110 and the inner ring 130. First and second outer raceways 162 and 164 corresponding to the hub raceway 120 and the inner raceway 132 are formed on an interior circumference of the outer ring 160, and a part of exterior circumference of the outer ring 160 protrudes radially outwardly to form a flange. A bolt hole (not shown) is bored at the flange such that the outer ring 160 is coupled to a vehicle body (for example, a knuckle) through coupling means such as a bolt.

The first tapered roller 140 is disposed between the hub raceway 120 and the first outer raceway 162. The second tapered roller 150 is disposed between the inner raceway 132 and the second outer raceway 164. The first and second tapered rollers 140 and 150 allow relative rotation of the hub 110 and the inner ring 130, and the outer ring 160.

In addition, a first sealing member 170 is mounted between the hub flange 114 and an outboard end of the outer ring 160 so as to prevent inflow of foreign material such as dust and moisture, and a second sealing member 172 is mounted between an inboard end of the outer ring 160 and the exterior circumference of the inner ring 130 so as to prevent inflow of foreign material such as dust and moisture. The first and second sealing members 170 and 172 may be sealing members of the same type or different type.

Meanwhile, it is exemplified in this specification that the tapered roller wheel bearing assembly 100 includes the hub 110 connected to the wheel and rotating and the outer ring 160 connected and fixed to the vehicle body, but the tapered roller wheel bearing assembly is not limited thereto. That is, the hub 110 may be connected to the vehicle body and the outer ring 160 is connected to the wheel and rotates.

In addition, the tapered roller wheel bearing assembly 100 according to the exemplary embodiment of the present invention uses the tapered rollers 140 and 150 as rolling elements. Therefore, an undercut for machining the raceways is necessary. For these purposes, a first undercut 124 is formed on the flange base 122 connected to the hub raceway 120. That is, a side edge of the first tapered roller 140 is inserted in the first undercut 124. However, if external impact is applied to the hub flange 114, stress is concentrated on the first undercut 124. Therefore, crack may occur or the tapered roller wheel bearing assembly 100 may be damaged. Therefore, a second undercut 126 is formed near the first undercut 124 so as to disperse stress according to the exemplary embodiment of the present invention. The second undercut 126 is formed on the flange base 122 and is spaced apart from the first undercut 124 radially outwardly by a predetermined distance. If the second undercut 126 is formed far from the first undercut 124, stress cannot be dispersed. In contrast, if the second undercut 126 is formed very close to the first undercut 124, the first and second undercuts 124 and 126 are operated as one groove and stress may be concentrated thereon. Therefore, a distance between the first undercut 124 and the second undercut 126 is very important to achieve spirit of the present invention, and may be set depending on size of the tapered roller wheel bearing assembly 100 as a suitable value by a person of an ordinary skill in the art. For example, the distance between the first undercut 124 and the second undercut 126 may be, but is not limited to, about 0.3 cm-2 cm.

In addition, size of the second undercut 126 may be larger than that of the first undercut 124 in order to heighten stress dispersion effect. Herein, the size of the undercut may be depth or radius of the undercut. Further, the second undercut 126 may be formed at the same radial position as the pilot 112, and may be formed at a radial inner position than the first sealing member 170.

The second undercut 126 disperses stress concentrated on the first undercut 124.

A cross-sectional shape of the second undercut 126 has a smooth curved line.

Figure 8:
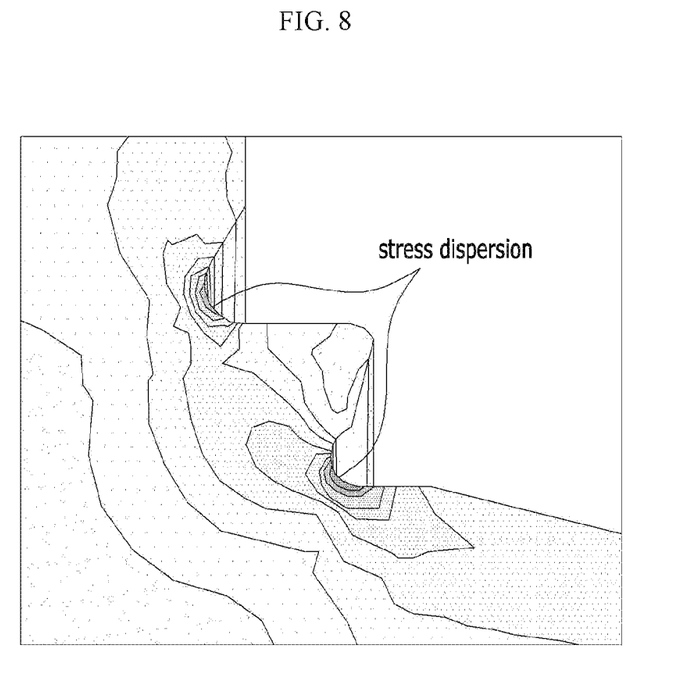
FIG. 8 illustrates stress distribution when impact is applied to a hub used in a tapered roller wheel bearing assembly according to an exemplary embodiment of the present invention.

FIG. 8 illustrates stress distribution when impact is applied to a hub used in a tapered roller wheel bearing assembly according to an exemplary embodiment of the present invention.

Since the second undercut 126 is positioned near the first undercut 124, as shown in FIG. 8, stress concentrated on the first undercut 124 is disposed to the first and second undercuts 124 and 126. If maximum stress applied to the first and second undercuts 124 and 126 is calculated, maximum stress applied to the first undercut 124 is larger than that applied to the second undercut 126. However, the maximum stress applied to the first undercut 124 is reduced by more than 10%, compared with a conventional taper bearing. That is, since part of stress concentrated on the first undercut 124 is absorbed by the second undercut 126, strength of stress concentrated on the first undercut 124 is reduced. Therefore, possibilities of crack occurrence around the first undercut 124 may be lowered and possibilities of breakdown of the tapered roller wheel bearing assembly 100 may also be lowered. Resultantly, the tapered roller wheel bearing assembly 100 may endure stronger impact.

As described above, stress may be dispersed by forming an additional undercut near an undercut for machining a hub raceway according to an exemplary embodiment of the present invention. Therefore, the tapered roller wheel bearing assembly may endure stronger impact.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A tapered roller wheel bearing assembly comprising:
   a hub provided with a hub flange for mounting a wheel formed radial outwardly at an end portion thereof and a hub raceway formed at a side portion close to the hub flange;
   an outer ring enclosing the hub and provided with an outer raceway corresponding to the hub raceway on an interior circumference thereof;

a tapered roller disposed between the hub raceway and the outer raceway and allowing a relative rotation of the hub and the outer ring;
a first sealing member for preventing inflow of foreign material, the first sealing member mounted between the hub flange and an end of the outer ring; and
a second sealing member for preventing inflow of foreign material, the second sealing member mounted between an interior circumference of the other end portion of the outer ring,
wherein a flange base is formed between the hub flange and the hub raceway and a first undercut for grinding the hub raceway is formed at the flange base,
wherein a second undercut for dispersing stress concentrated on the first undercut is further formed at the flange base, and
wherein the first undercut and the second undercut formed at the flange base are located in between the first sealing member and the second sealing member.

2. The tapered roller wheel bearing assembly of claim 1, wherein the second undercut is formed at a radial outside of the first undercut and spaced apart from the first undercut by a predetermined distance.

3. The tapered roller wheel bearing assembly of claim 1, wherein a size of the second undercut is larger than a size of the first undercut.

4. The tapered roller wheel bearing assembly of claim 1, wherein a pilot for supporting the wheel is protruded in an axial direction at a side surface of the hub and the second undercut is formed at the same radial position as the pilot substantially.

5. A tapered roller wheel bearing assembly comprising:
a hub provided with a hub flange for mounting a wheel formed radial outwardly at an end portion thereof, a stepped portion formed at an exterior circumference of the other end portion thereof, and a hub raceway formed at an exterior circumference between the hub flange and the stepped portion;
an inner ring press-fitted on the stepped portion of the hub and provided with an inner raceway formed at an exterior circumference thereof;
an outer ring enclosing the hub and the inner ring and provided with first and second outer raceways corresponding to the hub raceway and the inner raceway and formed at an interior circumference thereof;
a first tapered roller disposed between the hub raceway and the first outer raceway and allowing a relative rotation of the hub or the inner ring and the outer ring;
a second tapered roller disposed between the inner raceway and the second outer raceway and allowing the relative rotation of the hub or the inner ring and the outer ring;
a first sealing member for preventing inflow of foreign material, the first sealing member mounted between the hub flange and an end of the outer ring; and
a second sealing member for preventing inflow of foreign material, the second sealing member mounted between an interior circumference of the other end portion of the outer ring and an exterior circumference of the inner ring,
wherein a flange base is formed between the hub flange and the hub raceway and a first undercut for grinding the hub raceway is formed at the flange base,
wherein a second undercut for dispersing stress concentrated on the first undercut is further formed at the flange base, and
wherein the first undercut and the second undercut formed at the flange base are located in between the first sealing member and the second sealing member.

6. The tapered roller wheel bearing assembly of claim 5, wherein the second undercut is formed at a radial outside of the first undercut and spaced apart from the first undercut by a predetermined distance.

7. The tapered roller wheel bearing assembly of claim 5, wherein size of the second undercut is larger than that of the first undercut.

8. The tapered roller wheel bearing assembly of claim 5, wherein a pilot for supporting the wheel is protruded in an axial direction at a side surface of the hub and the second undercut is formed at the same radial position as the pilot substantially.

9. The tapered roller wheel bearing assembly of claim 5, wherein the second undercut is positioned at a radial inside from the first sealing member.

* * * * *